March 17, 1953 H. K. RIXFORD ET AL 2,631,666
TIMING AND RESETTING APPARATUS
Filed Sept. 28, 1949 6 Sheets-Sheet 1

INVENTOR.
HENRY K. RIXFORD
ALBERT E. ROCKWOOD
BY JACOB K. MAKI
Chas. T. Hawley
ATTY.

INVENTOR.
HENRY K. RIXFORD
ALBERT E. ROCKWOOD
JACOB K. MAKI
BY Chas. T. Hawley
Att'y.

March 17, 1953 H. K. RIXFORD ET AL 2,631,666
TIMING AND RESETTING APPARATUS
Filed Sept. 28, 1949 6 Sheets-Sheet 3

INVENTOR.
HENRY K. RIXFORD
ALBERT E. ROCKWOOD
JACOB K. MAKI
BY Chas. N. Hawley
ATT'Y.

March 17, 1953

H. K. RIXFORD ET AL 2,631,666

TIMING AND RESETTING APPARATUS

Filed Sept. 28, 1949

INVENTOR.
HENRY K. RIXFORD
ALBERT E. ROCKWOOD
BY   JACOB K. MAKI

Chas. T. Hawley
ATT'Y.

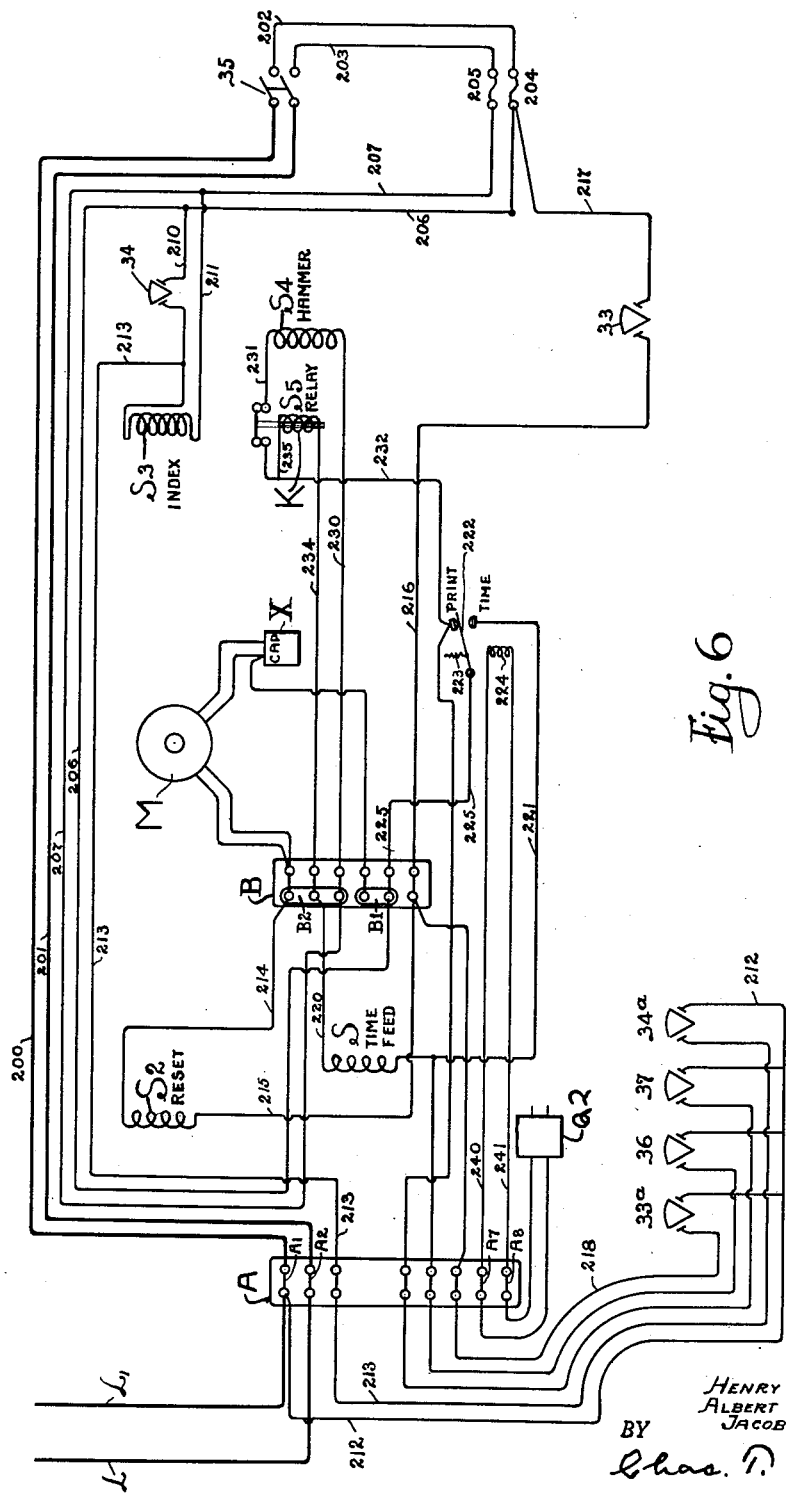

Patented Mar. 17, 1953

2,631,666

UNITED STATES PATENT OFFICE 2,631,666

TIMING AND RESETTING APPARATUS

Henry K. Rixford and Albert E. Rockwood, Gardner, and Jacob K. Maki, Westminster, Mass., assignors to Simplex Time Recorder Co., Gardner, Mass., a corporation of Massachusetts Application September 28, 1949, Serial No. 118,344

4 Claims. (Cl. 161—15)

This invention relates to apparatus designed for measuring and recording a time interval and also for mechanically resetting the time wheels and for actuating an index wheel and indicator.

The apparatus is capable of very general application but is particularly useful in measuring and recording the time intervals in a series of tests or observations.

An illustration of such use is in relation to testing the radio activity of a series of sample materials by timed exposure to a Geiger counter. When so used, the apparatus will record the length of each test to tenths of a second and will also record an index number for each successive test. At the end of each test, the time wheels are mechanically reset to zero, under either manual or automatic control, and preferably a zero reading is recorded.

It is the general object of our invention to provide improved apparatus for implementing the above defined purposes.

To the accomplishment of these general purposes, we have provided improved numbering mechanism and improved driving and control devices therefor. We have also provided improved mechanical reset mechanism and both manual and automatic control therefor. Our invention also involves an improved and simplified paper feed which is definitely related to the actuation of the impression hammer.

Our invention further relates to arrangements and combinations of parts which will be hereinafter described and more particularly pointed out in the appended claims.

A preferred form of the invention is shown in the drawings, in which

Fig. 6 is a wiring diagram.

Figure 4:
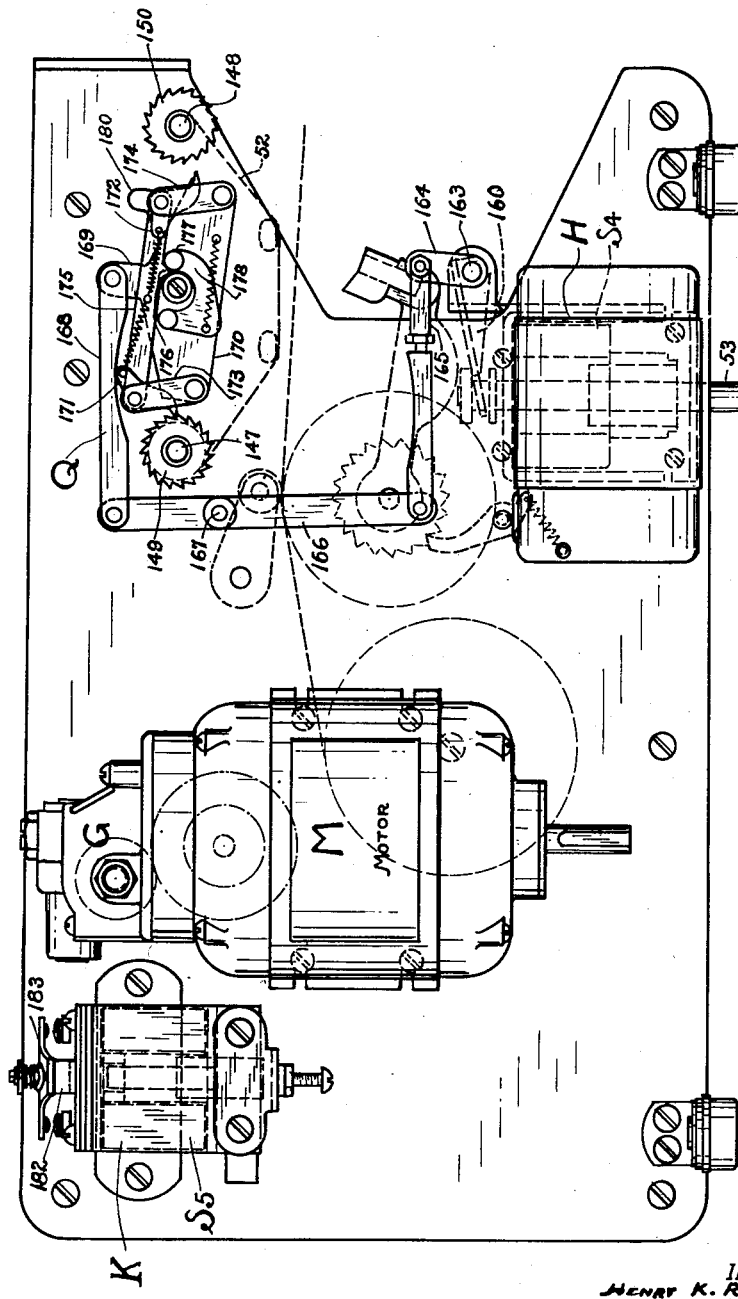
Fig. 4 is a left-hand side elevation of the apparatus.

Our improved apparatus includes time wheel mechanism T (Fig. 1), feed mechanism F, reset mechanism R, index feeding mechanism D, hammer operating mechanism H (Fig. 2), holding relay mechanism K, paper feed mechanism P, and ribbon feed mechanism Q (Fig. 4). A continuously rotating synchronous motor M (Fig. 4) provides power for the whole apparatus.

Figure 2:
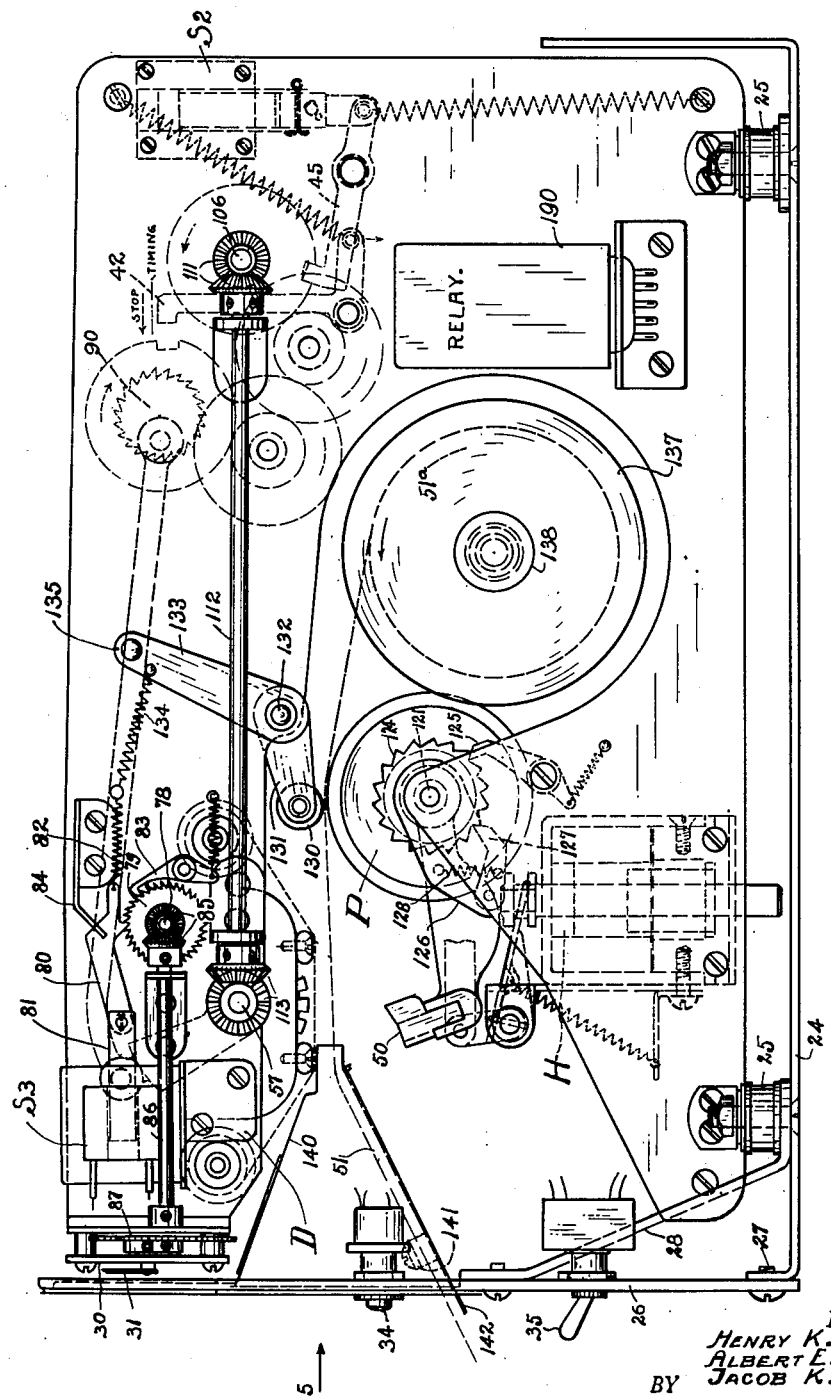
Fig. 2 is a right-hand side elevation thereof.
Figure 3:
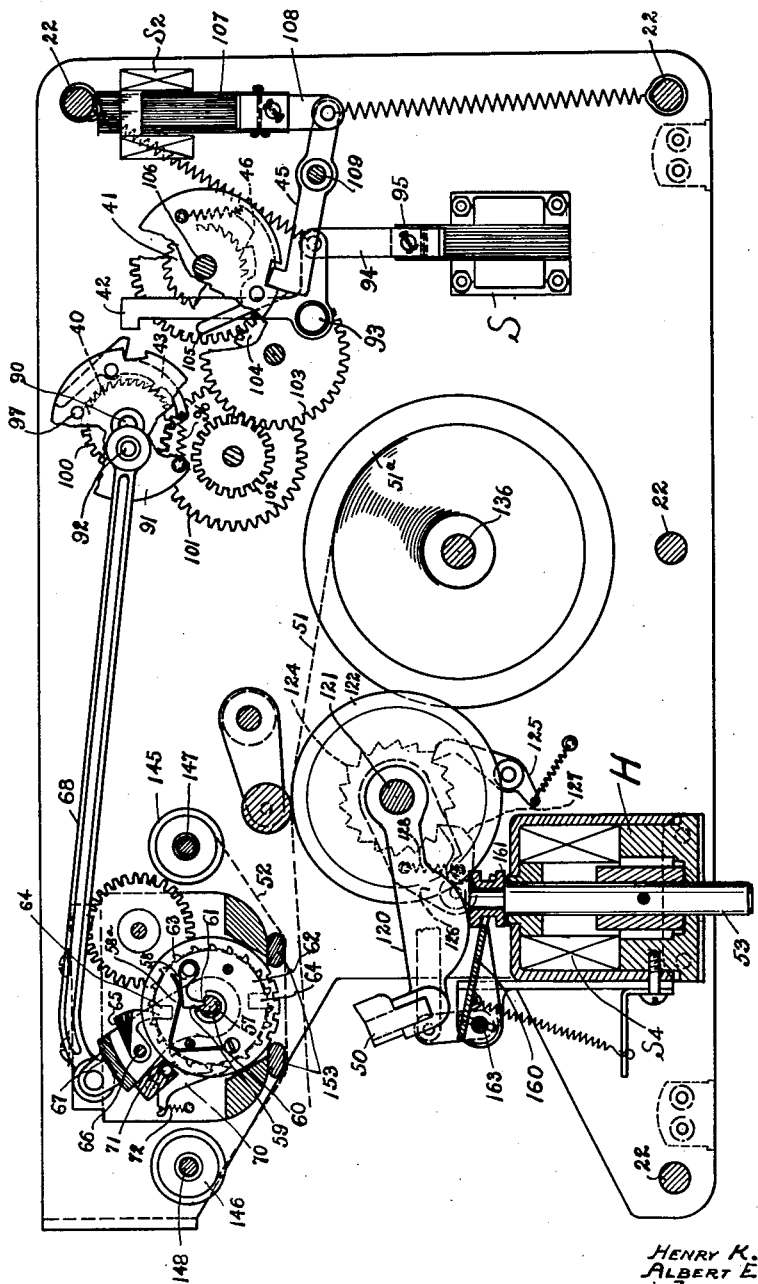
Fig. 3 is a right-hand sectional elevation, taken along the line 3—3 in Fig. 1.

The apparatus in general is mounted on a sheet metal supporting frame comprising side plates 20 and 21 (Fig. 1) held in spaced relation by cross rods 22 (Fig. 3). The side plates are bolted to a bottom plate 24 (Fig. 2) and rubber cushions 25 absorb vibration. A front plate 26 (Fig. 2) is secured to the bottom plate 24 by screws 27 and brackets 28.

Figure 5:
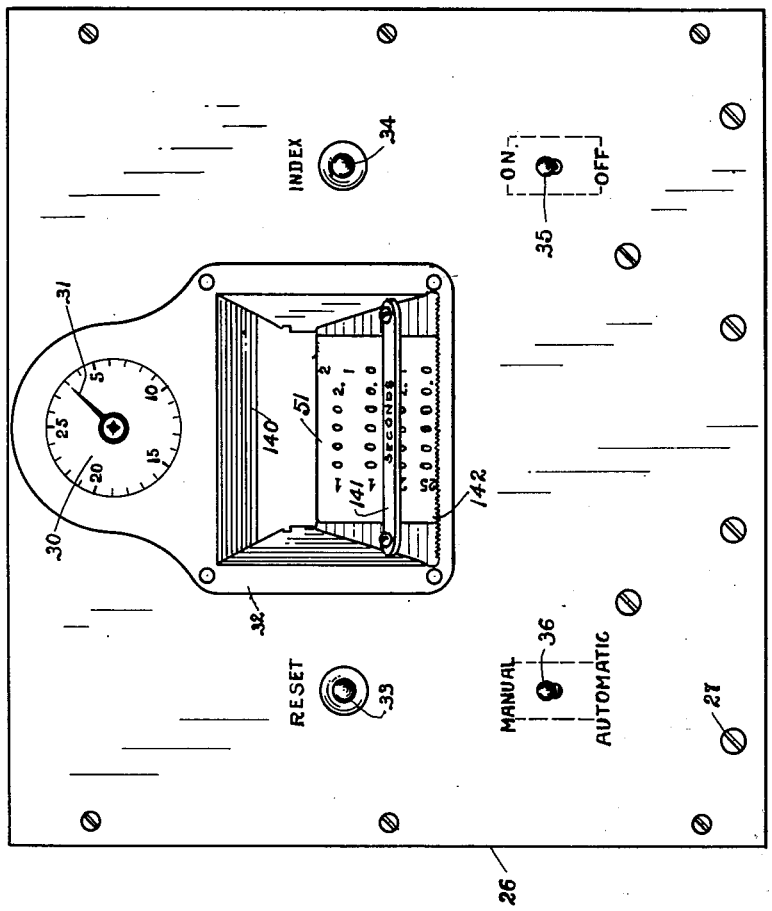
Fig. 5 is a front end elevation.

The front plate 26 (Fig. 5) supports an escutcheon covering an index dial 30 and index hand 31, and said front plate is provided with a frame 32 surrounding the paper delivery chute to be described. The plate 26 also supports a manual reset button 33, a manual index button 34, a power switch 35, and a switch 36 by which the apparatus may be shifted from manual to automatic control.

General operation

The motor M runs continuously and drives a ratchet wheel 40 (Fig. 3) at relatively high speed and a ratchet wheel 41 at relatively low speed.

A solenoid S withdraws a lock lever 42 and allows a feed pawl 43 to engage the ratchet wheel 40 and to be rotated thereby to advance the time wheels in the timing mechanism T one space for each rotation of the ratchet wheel 40.

A second solenoid S2 withdraws a lock lever 45 and allows a reset pawl 46 (Fig. 3) to engage the ratchet wheel 41 and to thereby cause the reset mechanism R to operate at the end of a test. A third solenoid S3 (Fig. 2) feeds the index wheel 46a (Fig. 1) one space for each operation of the solenoid S3.

A fourth solenoid S4 (Fig. 3) operates the hammer mechanism H and swings the hammer 50, the paper tape 51, and ink ribbon 52 against the time wheels in the timing mechanism T. On the return stroke of the hammer 50, the paper tape 51 is fed forward one space. The ribbon feed mechanism Q is also actuated from the plunger 53 of the solenoid S4. A second and consecutive movement of the hammer 50 and associated parts is prevented by the holding relay mechanism K (Figs. 1 and 4).

Time wheel mechanism T

Figure 1:
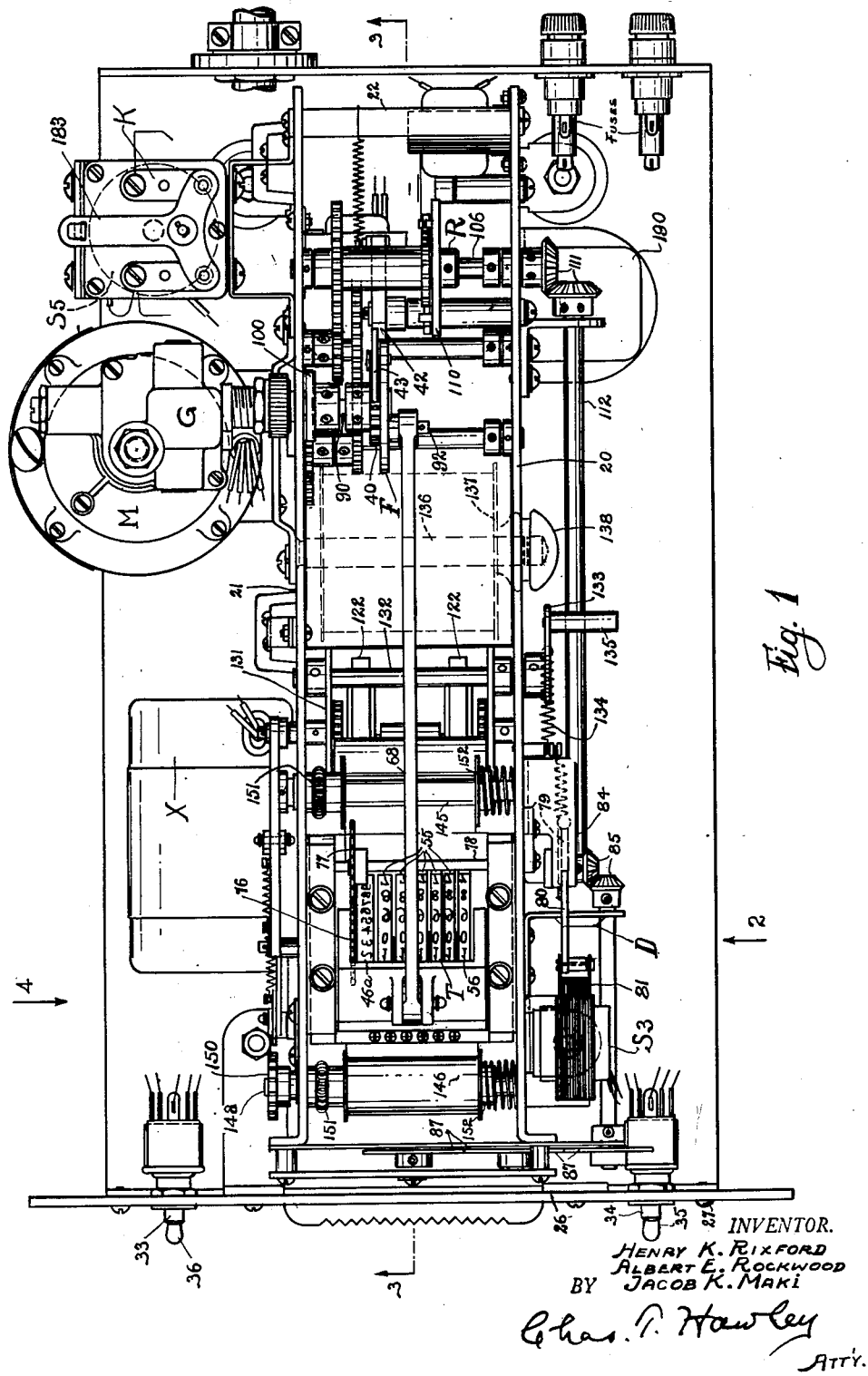
Fig. 1 is a top plan view of our improved apparatus.

The details of construction of the time wheel mechanism T are best shown in Figs. 1 and 3. Five time wheels 55 are provided, each numbered 1 to 9—1 to 9, and one time wheel 56 is numbered .1 to .9—.1 to .9. These time wheels are each rotatable clockwise as viewed in Fig. 3 on the reset shaft 57.

Each time wheel also has a pawl 58 movable into a slot 59 in the hub 60 of the time wheel and normally seated in a longitudinal groove 61 in the reset shaft 57 by a spring 58a. As the time wheels are fed clockwise, the pawls 58 are moved away from the groove 61.

Each time wheel 55 or 56 has a feed plate 62 with two sets of ten teeth and with two deep notches 64. A series of pawls 65 are pivoted at 66 on a rocker 67 which is intermittently oscillated by a feed link 68. The pawls 65 are spirally arranged and each pawl holds the next pawl raised and inoperative until the first-named pawl enters one of the deep notches 64. Holding pawls 70 are pivoted in a fixed comb 71 and are moved to holding position by springs 72.

Indexing mechanism D

The index wheel 46 (Fig. 1) is also loosely mounted on the reset shaft 57 and is numbered 1 to 25. The wheel 75 has a gear 76 engaged by a gear 77 on an index shaft 78. A ratchet wheel 79 (Fig. 2) on the shaft 78 is engaged by a feed pawl 80 pivoted on the plunger 81 of the index solenoid S3. The plunger 81 is moved to the left in Fig. 2 and withdraws the pawl 80 when the solenoid S3 is energized.

A spring 82 returns the plunger 81 and pawl 80 and feeds the ratchet wheel 79 one space. A yieldingly mounted holding pawl 83 prevents return movement of the ratchet wheel. A guide plate 84 positions the pawl 80.

The index shaft 78 is connected by bevel gears 85 to a countershaft 86 which is connected to rotate the index finger 31 through a train of gears 87. The solenoid S3 is energized by pressing the index button 34 or may be operated automatically at the start of each test.

Time wheel feed mechanism F

The time wheel feed mechanism F is actuated by the continuously rotating synchronous motor M, which drives a power shaft 90 (Figs. 1 and 3) through any suitable reduction gearing G (Figs. 1 and 4). A suitable capacitor X (Fig. 1) is supplied for the motor M.

The power shaft 90 supports and rotates the ratchet wheel 40 previously described. A disc 91 is loosely mounted on the shaft 90 adjacent the ratchet wheel 40 and carries the pawl 43 and also a crank-pin 92 for the link 68. The disc 91 is normally held from rotation by the lock lever 42, which also holds the feed pawl 43 away from the rotating ratchet wheel 40.

The lock lever 42 has a fixed pivot 93 (Fig. 3) and is connected by a link 94 to the plunger 95 of the solenoid S. When the solenoid S is energized and withdraws the lock lever 42, the disc 91 and pawl 43 are released and the pawl 43 is moved by a spring 96 to engage the ratchet wheel 40 and to be advanced thereby.

The rocker 67 is given one full oscillation for each rotation of the pawl 43 and crank disc 91 and advances the first or decimal time wheel one space. The gear ratio is such that each full oscillation takes $\frac{1}{10}$ of a second. This intermittent feed of the time wheels will continue as long as the circuit controlling the solenoid S remains closed.

When the solenoid S is de-energized, the lock lever 42 disengages the pawl 43 and again locks the disc 91.

Reset mechanism R

Special provision is made for resetting the time wheel mechanism T. For this purpose, a pinion 100 (Fig. 3) on the power shaft 90 is connected through gears 101 to 105 to a shaft 106 which supports and rotates the reset ratchet wheel 41. The lock lever 45 is connected to the plunger 107 of the solenoid S2 by a link 108. The lock lever 45 has a fixed pivot 109.

Each time the reset solenoid S2 is energized, the lock lever 45 is withdrawn, the disc 110 and the reset pawl 46 mounted thereon are released, the pawl 46 engages the ratchet wheel 41, and the shaft 106 makes one full revolution.

The shaft 106 is connected by bevel gears 111 (Fig. 1) to a countershaft 112 which in turn is connected by bevel gears 113 (Fig. 2) to the reset shaft 57. The shaft 57 is thus given a full revolution at each reset operation.

The rear shoulder of the groove 61 in the reset shaft 57 progressively engages the several pawls 58 and returns each time wheel to zero position. The solenoid S2 may be either manually or automatically controlled.

Hammer mechanism H

The hammer 50 (Fig. 3) is fixed to a hammer lever 120 which is mounted on a hammer shaft 121 which loosely supports two paper feed rolls 122. A rounded lower surface of the lever 120 rests on the plunger 53 of hammer solenoid S4. When the solenoid is energized, the plunger 53 rises and the hammer 50 strikes a single blow. A second consecutive blow is prevented by a relay mechanism K to be described.

Paper feed mechanism F

Each feed roll 122 has a ratchet wheel 124 (Figs. 1 and 2) fixed thereto and has a holding pawl 125 coacting therewith. The hammer shaft 121 has an arm 126 supporting a feed pawl 127 for each ratchet wheel 124. Each pawl has a spring 128 (Fig. 2). Each time the hammer is raised, the feed pawls move back one tooth. On the return or downward swing, the feed rolls are advanced to feed the paper tape 51. The return movement of the hammer is by gravity.

A pressure roll 130 (Fig. 2) is pivoted in arms 131 fixed on a shaft 132. An arm 133 fixed on the outer end of the shaft 132 is tensioned by a spring 134. A stud 135 (Fig. 1) may be used to manually relieve the pressure when renewing the paper supply.

The paper tape 51 (Figs. 1 and 2) is drawn from a roll 51a mounted on a fixed stud 136, and the roll is held thereon by a disc 137 having a yieldingly engaged hub or knob 138.

The tape 51 is delivered forward to the contracted inner end of a flaring chute 140 (Figs. 2 and 5) which is aligned with the open frame 32. The paper tape 51 passes under a cross bar 141 and may be torn off over the serrated edge 142 of the bottom member of the chute 140.

The flaring chute permits the printed record to be inspected as soon as the record is advanced into the chute.

Ribbon mechanism Q

The ink ribbon 52 is fed between spools 145 and 146 (Fig. 3) mounted on short arbors 147 and 148 (Fig. 4) having ratchet wheels 149 and 150 (Fig. 4). Springs 151 (Fig. 1) apply friction to the spools 145 and 146 and spring plungers 152 support the opposite ends of the spools. The ribbon 52 is drawn over fixed guide members 153 (Fig. 3) adjacent the printing point.

The ribbon feed is operated by a forked lever 160 (Fig. 3) embracing a collar 161 on the plunger 53 of the hammer solenoid S4. The lever 160 is fast on a rock shaft 163 (Fig. 4) having an arm 164 connected by an adjustable link 165 with the lower end of a lever 166 pivoted at 167.

The upper end of the lever 166 is connected by a link 168 to an arm 169 integral with a rock plate 170. Feed pawls 171 and 172 are mounted on pivoted arms 173 and 174 connected by a link 175. The link 175 has a lug 176 adapted to be positioned at either the left or the right of a pin 177 in a spring-actuated lock lever 178. The link 175 has a lug 180 by which the pawl assembly can be manually shifted to render either pawl 171 or 172 selectively operative to feed the ribbon in either direction. This ribbon shift mechanism is similar to that shown in Deane Patent No. 2,122,518.

*Hammer relay K*

The hammer relay mechanism K (Figs. 1 and 4) is provided to prevent a second consecutive hammer blow by rebound on a single closing of the circuit for the hammer solenoid S4 (Fig. 3).

The relay mechanism K comprises a solenoid S5 having a plunger 182 which engages and lifts a double contact member 183 inserted in the hammer solenoid circuit. The solenoid S5 (Fig. 4) is in a shunt circuit and remains closed after the hammer solenoid circuit is broken.

The solenoids S4 and S5 are parallel and are energized at the same time but the solenoid S4 acts more promptly than the solenoid S5. For a more complete description, reference is made to Ruttiman Patent #2,330,387.

*Shift relay*

It is essential that the type wheel feed be stopped and that the record be printed instantly at the end of a test or run. For this purpose, a shift relay 190 (Figs. 1 and 2) is provided which comprises essentially a single-pole, double-throw contact member which in normal position closes a gap in the time-feed circuit but in raised position opens the time-feed circuit and closes the hammer-solenoid circuit.

This shift relay is very quick-acting and the record is printed "on the fly" and without waiting for a feeding movement to be completed. The hammer 50 (Fig. 2) is made wide enough to print from two adjacent type wheels if neither is in exact printing position. Less than $\tfrac{1}{10}$ of a second can thus be read or estimated on the record.

*Wiring system*

In Fig. 6, we have shown a diagram of wiring connections by which our improved apparatus may be operated and controlled.

Line wires L and L' supply current to plates A1 and A2 in a terminal block A. These terminals A1 and A2 are connected by wires 200 and 201 to the main power switch 35 and then through wires 202 and 203, fuses 204 and 205, and wires 206 and 207 to terminal plates B1 and B2 on a terminal block B.

The motor M is connected directly to the plate B2 and through the capacitator X to the plate B1 and thus runs continuously when the switch 35 is closed.

The index solenoid S3 is connected through the push-button 34 and wires 210 and 211 to the power wires 206 and 207. One or more additional push-buttons 34a may be connected in parallel with push-button 34 by wires 212 and 213 for remote index control.

The reset solenoid S2 is connected by the wire 214 to the line terminal plate B2, and through the wires 215 and 216 to the reset push-button 33 and thence through wire 217 to the fuse 204 on the other side of the line. One or more additional push-buttons 33a may be connected in parallel with push-button 33 by wires 212 and 218 for remote control.

The time type wheel feed solenoid S is connected on one side through a wire 220 to the terminal plate B2. The other side of the solenoid S is connected through wire 221 to one terminal of a single pole double throw switch 222 forming the operating part of the shift relay 190 previously described. The switch 222 has a spring 223 and a solenoid 224. The switch is connected through a wire 225 to the terminal plate B1.

The hammer solenoid S4 is connected by a wire 230 to the terminal plate B2 and by wire 231 to relay device K and thence through wire 232 to the upper terminal of switch 222. When the switch is raised, the hammer circuit is completed through the wire 225 and terminal plate B1.

Hammer relay solenoid S5 is connected to terminal plate B2 by wire 234 and by wire 235 to wire 232 previously named. Solenoid S5 is thus in parallel to solenoid S4 but is not connected through relay device K. As stated, S5 acts more slowly than S4 but remains energized after the hammer solenoid circuit is broken by relay device K.

The time-print control solenoid 224 is connected by wires 240 and 241 to plates A7 and A8 in terminal block A. When type wheel feed is to start, the circuit of solenoid 224 is energized through any suitable control device Q2, (Fig. 6) which may be manually closed, and the time-feed solenoid S is energized for the interval to be timed. The circuit is broken at the end of the test or other interval to be measured, whereupon the spring 223 breaks the time-feed circuit and closes the hammer circuit. The time is then printed exactly at the end of the time interval and without perceptible delay.

Push-button 37 gives manual control of the hammer mechanism, so that a record may be printed at any time. Push-button 36 will start the time-feed manually whenever needed and for as long as desired.

Having described the construction and operation of a preferred form of our invention, it will be clear that we have provided an improved timing and recording apparatus, together with indexing and resetting mechanism, and that our improved apparatus is adapted for use for many different purposes and in many applications.

The shift-relay and associated structure which selectively controls the hammer operating means in predetermined relation to the feed of the time wheels is not claimed herein but forms the subject matter of a divisional application filed by us on December 13, 1951, Serial No. 261,552.

Having thus described our invention and the advantages thereof, we do not wish to be limited to the details herein disclosed, otherwise than as set forth in the claims, but what we claim is:

1. In a timing apparatus, a set of time wheels, a continuously operated motor, a ratchet wheel continuously rotated thereby, a disc loosely mounted concentric with said ratchet wheel and connected to advance said time wheels and supporting a feed pawl, operating connections from said disc to said time wheels, a lock lever for said disc and feed pawl which normally holds said disc stationary and said feed pawl inoperative, and control means effective to withdraw said lock lever for the time interval to be measured to unlock said disc and to simultaneously release said pawl for engagement with said ratchet wheel.

2. The combination in a timing apparatus as set forth in claim 1, in which each complete rotation of said disc advances the first time wheel one unit-space.

3. The combination in a timing apparatus as set forth in claim 1, which comprises motor-driven means to reset the time wheels in zero position, and said means including a continuously rotated ratchet wheel and a pawl rotatably mounted and engaging said wheel when said pawl is released.

4. In a timing apparatus, a set of time wheels, a continuously operated motor, a continuously and relatively rapidly rotated ratchet wheel driven by said motor and which may be connected to feed said time wheels, a continuously and relatively slowly rotated ratchet wheel driven by said motor and which may be connected to reset said time wheels, and selective means to render either ratchet wheel operative.

HENRY K. RIXFORD.
ALBERT E. ROCKWOOD.
JACOB K. MAKI.

REFERENCES CITED

The following references are of record in the file of this patent:

UNITED STATES PATENTS

| Number | Name | Date |
|---|---|---|
| 420,852 | Wood | Feb. 4, 1890 |
| 825,451 | Gallagher | July 10, 1906 |
| 1,553,809 | Everett | Sept. 15, 1925 |
| 1,846,352 | Ohmer et al. | Feb. 23, 1932 |
| 1,963,290 | Brondello | June 19, 1934 |
| 1,965,969 | Sturtevant | July 10, 1934 |
| 2,153,185 | Harrison | Apr. 4, 1939 |
| 2,219,636 | Schwartz | Oct. 29, 1940 |
| 2,246,538 | Rezsny | June 24, 1941 |
| 2,251,792 | Hazard | Aug. 5, 1941 |
| 2,291,135 | Avery | July 28, 1942 |
| 2,298,343 | Bugg | Oct. 13, 1942 |
| 2,313,189 | Wyeth | Mar. 9, 1943 |
| 2,362,392 | Molden et al. | Nov. 7, 1944 |
| 2,447,803 | Hobby | Aug. 24, 1948 |
| 2,494,955 | Mayer et al. | Jan. 17, 1950 |
| 2,544,610 | Nelson | Mar. 6, 1951 |
| 2,568,523 | Thomas | Sept. 18, 1951 |